Dec. 15, 1970 C. R. WOOLUMS 3,546,804
FISHING LURES
Filed Aug. 5, 1968
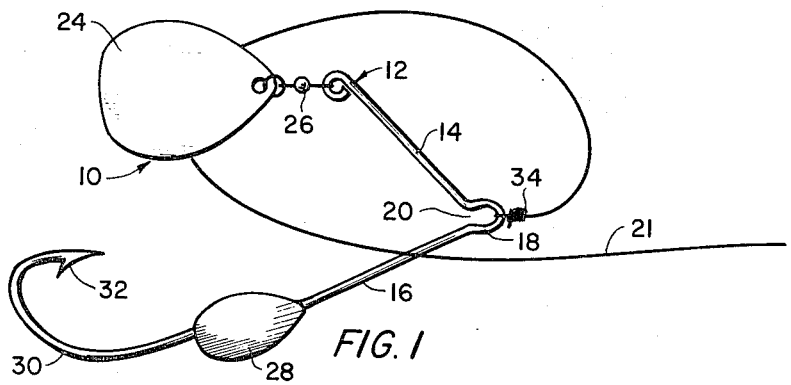
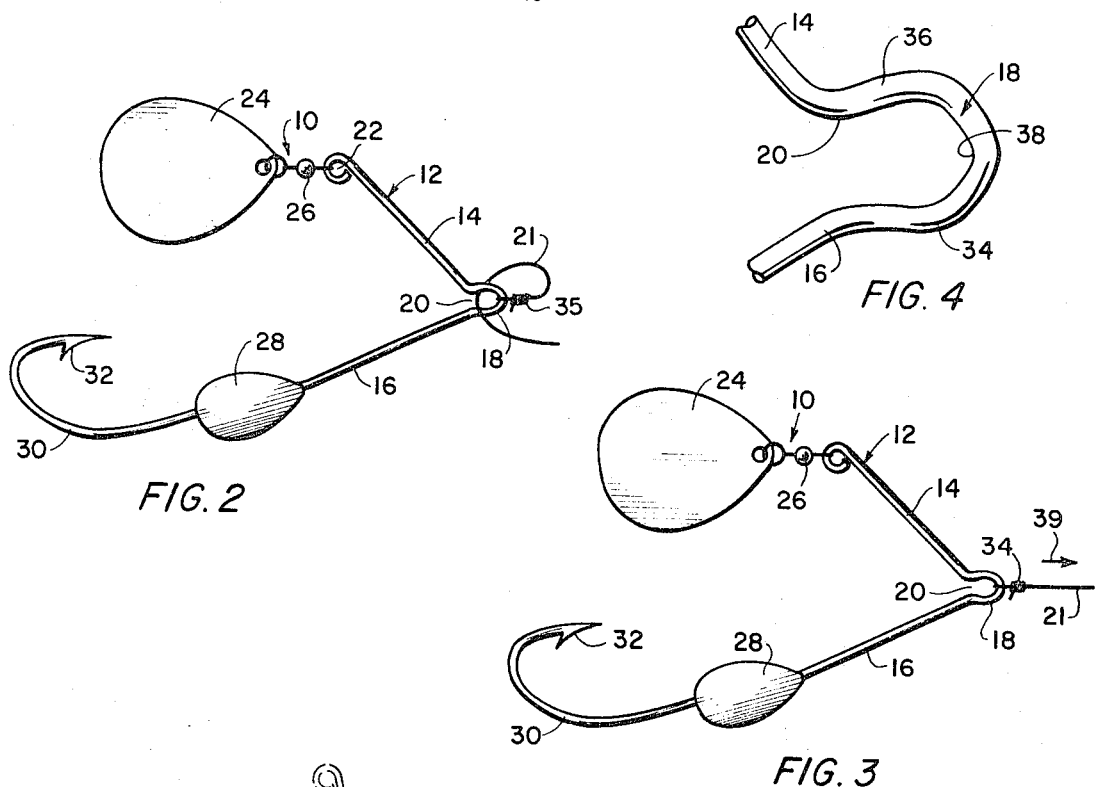
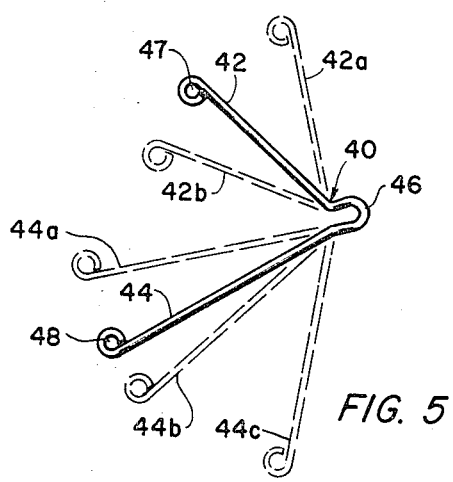
CHARLES R. WOOLUMS
INVENTOR.
BY William S. Dorman
ATTORNEY

United States Patent Office 3,546,804
Patented Dec. 15, 1970

3,546,804
FISHING LURES
Charles R. Woolums, Tulsa, Okla., assignor to
Marvin D. Coleman, Okmulgee, Okla.
Filed Aug. 5, 1968, Ser. No. 750,056
Int. Cl. A01k 85/00
U.S. Cl. 43—42.11
6 Claims

ABSTRACT OF THE DISCLOSURE

A fishing lure comprising a pair of diverging arm members connected at their adjacent ends by an open eye. A spinner is secured to the outer end of one arm member and a weight is affixed to the outer end of the other arm member with a fish hook extending outwardly from the weight. The eye is formed with arcuate portions and with a detent for receiving and retaining the fishing line during use of the lure.

---

This invention relates to improvements in fishing lures and more particularly, but not by way of limitation, to a fishing lure having an open eye for facilitating securing of the fishing line to the lure and improving the efficiency thereof in use.

The usual fishing lure available today is provided with a closed eye member to which the fishing line is attached for securing the lure thereto. The closed eye member may be formed in many ways, and in certain types of lures this is considered to be the best or at least the most practical eye to use. However, in other types of lures, as for example a spinner type lure, the closed eye structure may be of great disadvantage in that the fishing line frequently loops over the upright or upwardly extending shaft or other portions of the lure or pulls into or is caught around the closed eye juncture. When the line is caught around the eye, it tends to drag the lure through the water in an unconventional or unnatural manner, resulting in poor or inefficient action of the lure. Furthermore, the line may be wedged tightly into the V of the closed eye during use of the lure, which may crimp or weaken the line, and may result in breakage of the line if a fish is caught on the lure, thus causing loss of the lure and fish.

The present invention contemplates a novel fishing lure device particularly designed and constructed for eliminating snagging or catching of the fishing line on the lure in any manner which might result in an inefficient or detrimental action of the lure. The novel fishing lure device is provided with an open eye member whereby the fishing line may be secured thereto in a manner permitting full freedom of movement of the line without hindrance to the preferred connection of the line with the lure. In the event the line loops around the lure, or wraps around the device during use, or for any other reason, the structure of the open eye permits the line to return to the normal position thereof. This eliminates snagging of the line in an unnatural position with respect to the lure, and as a result the pull of the line on the lure during use thereof will always provide the most efficient action for the lure as the lure moves through the water. In addition, the particular configuration of the eye member causes the line to seek the optimum position with respect to the trailing arm portion of the lure device which assures that the lure will be pulled through the water at the optimum angle with respect to the horizontal. In this manner, the lure device will be pulled through the water with the plane of the lure in the most desirable attitude or position in the water for catching fish. Whereas the open eye principle is of particular advantage in certain types of spinner lures, it is to be noted that the invention is not limited to any particular lure type.

It is an important object of this invention to provide a novel fish lure particularly designed and constructed for facilitating the connection of a fish line to the lure in a manner providing improved action for the lure.

It is another object of this invention to provide a novel fish lure wherein snagging or catching of the line on the eye portion of the lure is substantially eliminated to provide improved results for the lure.

A further object of this invention is to provide a novel open eye fishing lure wherein the open eye is of a configuration whereby the fishing line is retained in an optimum position for pulling the lure through the water at the proper angular disposition.

Another object of this invention is to provide a novel fish lure device which is simple and efficient in operation and economical and durable in construction.

Other and further objects and advantageous features of the present invention will hereinafter more fully appear in connection with a detailed description of the drawings in which:

FIG. 1 is a side elevational view of a lure embodying the invention and showing the fishing line in one possible postion relative thereto.

FIG. 2 is a view similar to FIG. 1 showing the fishing line in a second position relative to the fish lure.

FIG. 3 is a view similar to FIG. 1 showing the fishing line and lure in the normal positions therefor during use.

FIG. 4 is an enlarged side elevational view of an open eye member embodying the invention.

FIG. 5 is a side elevational view of a lure device embodying the invention with one position of the arms thereof depicted in solid lines and additional positions for the arms depicted in dotted lines.

Referring to the drawings in detail, reference character 10 generally indicates a fishing lure of the single spinner type; however, it is to be noted there is no intention of limiting the invention to this type lure. The lure 10 comprises a body 12 having a pair of diverging arms 14 and 16 connected at one end by an eye or loop member 18. The inwardly-directed portion of the eye 18 which is disposed between or at the juncture of the arms 14 and 16 is peripherally open as shown at 20 for a purposes as will be hereinafter set forth. The arms 14 and 16 are disposed in a common plane or are in planar alignment and this is possible because of the open construction of the eye 18. A fishing line 21, or the like, is secured to the eye 18 in a manner as will be hereinafter set forth.

In the particular embodiment depicted in FIGS. 1 through 3 the outer extremity of the arm or shaft 14 terminates in a closed eye member 22 having a suitable spinner member 24 secured thereto in any well-known manner, such as by the connection member 26. A bulbous member or body 28 is secured around the outer extremity of the arm 16 in any well-known manner to provide a weight for the lure 10, and a suitable hook member 30 having the usual barb member 32 is carried by the weight or body 28 as is well known. Of course, it is common practice to secure feathers, or the like, (not shown) on the hook 30 or around the hook for concealing the hook 30 and barb 32 and to provide more attraction for the fish during use of the lure 10. The feathers are eliminated in the drawings in order to more clearly illustrate the structure of the lure body portion.

As hereinbefore set forth, the eye 18 is open at 20, and the fishing line 21 is secured to the eye in any suitable or well-known manner. As particularly depicted herein, one end of the line 21 is passed around the eye 18 and snugly secured thereon by winding the said one end around the adjacent portion of the line itself to form a knotted winding as shown at 35. It may be desirable to secure the fishing line 21 to a swivel member (not shown), or any other of several well-known connecting devices, with the connecting device being connetced with the eye 18. Of course, in any event, the line 21 is free to move around and along the body 12, and the eye 22 and body 28 retain the line on the body 12 by precluding accidental dislodging of the line therefrom.

Referring particularly to FIGS. 1 through 3, the line 21 may wind around or loop around the lure 10 in any of several ways during use of the lure, such as when casting the lure into a body of water (not shown). By way of example, the line 21 may pass around the upwardly-extending spinner shaft or arm 14 of lure 10 in a relatively large loop as shown in FIG. 1 as the lure is in use, or otherwise handled. In this event, a continued manual pull on the line will reduce the size of the loop of the line 21, as shown in FIG. 2, and the line will pass through the opening 20 of the eye 18. Since the eye 18 is open at 20, the line 21 can in no manner catch or lodge at the juncture between the arms 14 and 16, but rather a continued pull on the line 21 will cause the line to move or return to the normal position therefor shown in FIG. 3.

Referring now to FIG. 4, the eye 18 is designed and constructed of a particular configuration for increasing the overall efficiency of action of the lure 10 during use. The lower portion 34 of the eye 18 as shown in the drawings is preferably of a slightly smaller curvature or curved at a slightly greater radius than the upper portion 36 thereof. In addition, a relatively small detent or notch portion 38 is provided at the juncture of the curved portions 34 and 36. The notch portion 38 is preferably disposed in substantial alignment with the longitudinal axis of the arm 16, and the complementary curved portions 34 and 36 tend to urge the line 21 to slide into and remain within the notch portion 38 during use of the lure 10. Thus, the usual or normal manual pull on the line 21 in the direction indicated by the arrow 39 during use of the lure 10 drags the lure 10 through the water with the arm 16 at a slightly downward angular position with respect to the horizontal and the arm 14 in an angularly upward position as shown in FIGS. 1, 2, and 3.

The plane of the arms 14 and 16 is common or in planar alignment with the plane of the eye 18. Furthermore, the plane of the hook member 30 and barb 32 is substantially parallel with and in substantial alignment with the plane of the eye 18. Thus, as the lure 10 is pulled through the water with the arm 16 in the position shown in the drawings, the spinner arm 14, the hook 30 and barb 32 are maintained in an upwardly extending direction, with the plane of the arms 14 and 16, and the plane of the hook being substantially vertical. This position of the lure 10 also assures a proper attitude or positioning of the arm 14 and the spinner member 24 will thus be moved through the water in a manner assuring the most efficient action therefor to attract fish.

Referring now to FIG. 5, a fishing lure device 40 is depicted which may be utilized in the manner of the body 12 in the construction or assembly of substantially any type of fishing lure. The device 40 comprises a pair of diverging arms 42 and 44 connected at one end by an open eye 46 generally similar to the eye 18 hereinbefore set forth. The arms 42 and 44 are disposed in a common plane as are the arms 14 and 16. The arms 42 and 44 may be bent or otherwise formed with substantially any desired angle therebetween. For example, the arm 42 may be bent or formed in any of the positions indicated in dotted lines at 42a and 42b, or at substantially any other desired angular position, and the arm 44 may be bent or formed in any of the positions indicated in dotted lines 44a, 44b, and 44c, or at substantially any other desired angular position. The outer extremity of each arm 42 and 44 may be of any desired configuration, and may be attached or secured to any suitable connection member (not shown), swivel members (not shown), spinner members (not shown), or the like, as desired. As particularly shown in FIG. 5, the outer extremity of the arm 42 is provided with a closed eye member 47 for facilitating securing of the connection members, or the like, to arm 42. Similarly, the outer extremity of the arm 44 is provided with a closed eye 48 for facilitating securing of a connection member, or the like, thereto. Of course, this is merely illustrative, and there is no limitation of the lure device 40 to this particular configuration. The action or operation of a lure incorporating the device 40 is substantially identical as hereinbefore set forth in connection with the lure 10.

From the foregoing it will be apparent that the present invention provides a novel fishing lure of the open-eye type particularly designed and constructed for precluding snagging or catching of the fishing line in the V of the eye, and for maintaining the fishing line in the most desirable position on the eye whereby the normal pull on the fishing line will drag the lure through the water at the optimum positioning or attitude therefor. The novel fishing lure device includes a pair of diverging arms disposed in co-planar relationship and connected at one end by the open eye member, and the eye member is of a particular arcuate configuration for urging the fishing line toward and retaining the line in the desired position of the eye, thus assuring an efficient action for the lure during use thereof.

Whereas the present invention has been described in particular relation to the drawings attached hereto, it should be understood that other and further modifications, apart from those shown or suggested herein, may be made within the spirit and scope of this invention.

What is claimed is:

1. A fish lure device comprising a pair of rearwardly diverging arm members disposed in coplanar relationship, and an eye member with a rearward peripheral opening and connecting the adjacent ends of the arm members for facilitating connection of a fishing line to the lure device, said eye member being unobstructed in use through said rearward opening peripheral to improve the operating efficiency of the line connection to the lure device, and weight means secured to one of said arm members, hook and barb means carried by the weight means, and spinner means attached to the said other arm.

2. A fish lure device as set forth in claim 1 wherein the plane of the eye is parallel to and in substantial alignment with the plane of the arm members.

3. A fish lure device as set forth in claim 1 wherein the configuration of the eye member includes complementary arcuate portions for urging the fishing line into a preselected position on the eye.

4. A fish lure device as set forth in claim 1 wherein the eye member is provided with a relatively small detent portion disposed in substantial alignment with the longitudinal axis of one of the arm members, whereby manual pulling of the fishing line during use of the lure device moves the lure at the optimum planar attitude for efficient operation thereof.

5. A fish lure device as set forth in claim 1 wherein the eye member comprises a pair of complementary arcuate portions, a detent portion at the juncture of the complementary arcuate portions for receiving and retaining the fishing line during use of the device, said detent portion being disposed in alignment with the longitudinal axis of the weighted arm member whereby pull on the fishing line during use of the lure will maintain the plane of the arms substantially vertical with the said weighted arm extending in a slightly downward angular position and the other of said arms extending in an upwardly angular position.

6. A fish lure device as set forth in claim 1 wherein the plane of the hook and barb means is substantially parallel and in substantial alignment with the plane of the eye whereby the hook and barb means are disposed substantially vertically during use of the lure device.

References Cited
UNITED STATES PATENTS

| | | | |
|---|---|---|---|
| 2,482,648 | 9/1949 | Brandt | 43—44.83X |
| 2,802,294 | 8/1957 | Litwin | 43—42.49X |
| 3,143,824 | 8/1964 | Thomas | 43—42.11 |

SAMUEL KOREN, Primary Examiner

D. J. LEACH, Assistant Examiner

U.S. Cl. X.R.

43—42.39, 42.49, 44.81, 44.83